United States Patent
Sigmund et al.

(10) Patent No.: US 8,737,580 B2
(45) Date of Patent: May 27, 2014

(54) TOGGLING VOICEMAIL CLASS OF SERVICE

(75) Inventors: William Joseph Sigmund, Cumming, GA (US); Michael Robert Zubas, Marietta, GA (US); Brian Keith Rainer, Lawrenceville, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 221 days.

(21) Appl. No.: 12/160,931

(22) PCT Filed: Jun. 20, 2008

(86) PCT No.: PCT/US2008/067612
§ 371 (c)(1),
(2), (4) Date: Jul. 15, 2008

(87) PCT Pub. No.: WO2009/029330
PCT Pub. Date: Mar. 5, 2009

(65) Prior Publication Data
US 2010/0189229 A1    Jul. 29, 2010

Related U.S. Application Data

(60) Provisional application No. 60/969,419, filed on Aug. 31, 2007.

(51) Int. Cl.
*H04M 1/64* (2006.01)
(52) U.S. Cl.
USPC .................................... 379/88.22; 379/88.18
(58) Field of Classification Search
USPC ............ 379/88.17, 67.1, 88.11, 88.12, 88.13, 379/88.18, 201.03
See application file for complete search history.

(56) References Cited

U.S. PATENT DOCUMENTS

| | | | |
|---|---|---|---|
| 5,329,579 | A | 7/1994 | Brunson |
| 5,524,137 | A | 6/1996 | Rhee |
| 5,572,578 | A | 11/1996 | Lin et al. |
| 5,737,394 | A | 4/1998 | Anderson et al. |

(Continued)

FOREIGN PATENT DOCUMENTS

| | | |
|---|---|---|
| EP | 0 631 452 | 12/1994 |
| EP | 1 113 631 | 7/2001 |

(Continued)

OTHER PUBLICATIONS

Office Action mailed on Aug. 16, 2013 in U.S. Appl. No. 13/654,480.

(Continued)

*Primary Examiner* — Amal Zenati
(74) *Attorney, Agent, or Firm* — Hartman & Citrin LLC

(57) ABSTRACT

A method for toggling voicemail class of service (CoS) including receiving a subscriber-initiated CoS change request at a billing system, wherein the CoS change request includes a request to change from a first CoS associated with a first voicemail system (VMS) to a second CoS associated with a second VMS. The method further includes validating the CoS change request at the billing system, sending a CoS delete request to the first VMS to at least temporarily disable a first voicemail account, and sending a provisioning request to the second VMS to provision a second voicemail account. A system for toggling voicemail CoS and a computer-readable medium for toggling CoS from a mobile device.

11 Claims, 6 Drawing Sheets

(56) References Cited

U.S. PATENT DOCUMENTS

| | | | |
|---|---|---|---|
| 5,737,395 A | 4/1998 | Irribarren | |
| 5,809,111 A | 9/1998 | Matthews | |
| 6,005,870 A | 12/1999 | Leung et al. | |
| 6,108,559 A | 8/2000 | Astrom et al. | |
| 6,148,212 A | 11/2000 | Park et al. | |
| 6,246,871 B1 | 6/2001 | Ala-Laurila | |
| 6,335,962 B1 | 1/2002 | Ali et al. | |
| 6,351,523 B1 | 2/2002 | Detlef | |
| 6,360,272 B1 | 3/2002 | Lincke et al. | |
| 6,480,885 B1 | 11/2002 | Olivier | |
| 6,522,727 B1 | 2/2003 | Jones | |
| 6,751,298 B2 | 6/2004 | Bhogal et al. | |
| 6,829,334 B1* | 12/2004 | Zirngibl et al. | 379/88.17 |
| 6,868,143 B1* | 3/2005 | Menon et al. | 379/88.13 |
| 6,879,847 B1 | 4/2005 | Kato | |
| 6,912,275 B1 | 6/2005 | Kaplan | |
| 6,937,868 B2 | 8/2005 | Himmel et al. | |
| 6,981,023 B1 | 12/2005 | Hamilton et al. | |
| 7,095,828 B1 | 8/2006 | Elliot et al. | |
| 7,142,648 B1 | 11/2006 | Miller | |
| 7,171,186 B2 | 1/2007 | Miyachi et al. | |
| 7,248,857 B1* | 7/2007 | Richardson et al. | 455/413 |
| 7,277,529 B1 | 10/2007 | Wuthnow et al. | |
| 7,283,809 B1 | 10/2007 | Weinman | |
| 7,369,648 B1 | 5/2008 | Chang | |
| 7,680,491 B2 | 3/2010 | Zabawskyj et al. | |
| 7,738,833 B2 | 6/2010 | Bettis et al. | |
| 7,796,977 B2 | 9/2010 | Vander Veen | |
| 7,826,831 B2 | 11/2010 | Bettis et al. | |
| 7,894,580 B2 | 2/2011 | Veen et al. | |
| 8,320,535 B2 | 11/2012 | Alperin et al. | |
| 2002/0015403 A1 | 2/2002 | McConnell et al. | |
| 2002/0037075 A1 | 3/2002 | Flanagan | |
| 2002/0049768 A1 | 4/2002 | Peek et al. | |
| 2002/0077098 A1 | 6/2002 | Tiliks et al. | |
| 2002/0112007 A1 | 8/2002 | Wood et al. | |
| 2002/0115429 A1 | 8/2002 | Deluca et al. | |
| 2003/0091169 A1 | 5/2003 | Cain | |
| 2003/0099341 A1 | 5/2003 | Williams | |
| 2003/0220784 A1 | 11/2003 | Fellenstein et al. | |
| 2004/0023643 A1 | 2/2004 | Vander Veen et al. | |
| 2004/0081088 A1 | 4/2004 | Schinner et al. | |
| 2004/0139471 A1 | 7/2004 | Geen et al. | |
| 2004/0146147 A1 | 7/2004 | Picard et al. | |
| 2004/0248594 A1 | 12/2004 | Wren | |
| 2004/0252679 A1 | 12/2004 | Williams et al. | |
| 2004/0264658 A1 | 12/2004 | Cline et al. | |
| 2005/0089149 A1 | 4/2005 | Elias | |
| 2005/0102368 A1 | 5/2005 | Forman et al. | |
| 2005/0113078 A1 | 5/2005 | Deitrich | |
| 2005/0186944 A1 | 8/2005 | True et al. | |
| 2005/0213715 A1 | 9/2005 | Winick | |
| 2006/0003745 A1 | 1/2006 | Gogic | |
| 2006/0025114 A1 | 2/2006 | Bales et al. | |
| 2006/0025140 A1 | 2/2006 | Bales et al. | |
| 2006/0031470 A1 | 2/2006 | Chen et al. | |
| 2006/0059361 A1 | 3/2006 | Paden | |
| 2006/0062356 A1 | 3/2006 | Vendrow | |
| 2006/0171511 A1 | 8/2006 | Liu et al. | |
| 2006/0173959 A1 | 8/2006 | McKelvie et al. | |
| 2006/0239419 A1 | 10/2006 | Joseph et al. | |
| 2006/0251222 A1 | 11/2006 | Abramson et al. | |
| 2006/0253584 A1 | 11/2006 | Dixon et al. | |
| 2006/0281443 A1 | 12/2006 | Chen et al. | |
| 2007/0038483 A1 | 2/2007 | Wood | |
| 2007/0066284 A1 | 3/2007 | Gatzke et al. | |
| 2007/0127632 A1 | 6/2007 | Swingle et al. | |
| 2007/0127663 A1 | 6/2007 | Bae | |
| 2007/0140443 A1 | 6/2007 | Woodring | |
| 2007/0143106 A1 | 6/2007 | Dunsmuir | |
| 2007/0173233 A1 | 7/2007 | Vander Veen et al. | |
| 2007/0180032 A1 | 8/2007 | Pearson | |
| 2007/0180504 A1 | 8/2007 | Hung | |
| 2007/0207785 A1 | 9/2007 | Chatterjee et al. | |
| 2007/0213050 A1 | 9/2007 | Jiang | |
| 2007/0223666 A1 | 9/2007 | Teague | |
| 2007/0239833 A1 | 10/2007 | Alperin et al. | |
| 2007/0287453 A1 | 12/2007 | Wang | |
| 2008/0008163 A1 | 1/2008 | Castell et al. | |
| 2008/0008299 A1 | 1/2008 | Didcock et al. | |
| 2008/0056459 A1 | 3/2008 | Vallier et al. | |
| 2008/0062246 A1 | 3/2008 | Woodworth et al. | |
| 2008/0062938 A1 | 3/2008 | Gil-soo et al. | |
| 2008/0081609 A1 | 4/2008 | Burgan et al. | |
| 2008/0140767 A1 | 6/2008 | Rao et al. | |
| 2008/0167007 A1 | 7/2008 | Novick et al. | |
| 2008/0167010 A1 | 7/2008 | Novick et al. | |
| 2008/0167014 A1 | 7/2008 | Novick et al. | |
| 2008/0188204 A1 | 8/2008 | Gavner et al. | |
| 2008/0200152 A1 | 8/2008 | Moore | |
| 2008/0207176 A1 | 8/2008 | Brackbill et al. | |
| 2008/0243513 A1 | 10/2008 | Bucchieri et al. | |
| 2008/0260118 A1 | 10/2008 | Lyle | |
| 2008/0298459 A1 | 12/2008 | Yang et al. | |
| 2008/0300873 A1 | 12/2008 | Siminoff | |
| 2009/0149220 A1 | 6/2009 | Camilleri et al. | |
| 2009/0239507 A1 | 9/2009 | Sigmund et al. | |
| 2009/0253407 A1 | 10/2009 | Sigmund et al. | |
| 2009/0253412 A1 | 10/2009 | Sigmund et al. | |
| 2009/0253413 A1 | 10/2009 | Sigmund et al. | |
| 2010/0159886 A1 | 6/2010 | Sigmund et al. | |
| 2010/0159888 A1 | 6/2010 | Sigmund et al. | |
| 2010/0159889 A1 | 6/2010 | Sigmund et al. | |
| 2010/0159890 A1 | 6/2010 | Sigmund et al. | |
| 2010/0159891 A1 | 6/2010 | Sigmund et al. | |
| 2010/0166161 A1 | 7/2010 | Dhawan et al. | |
| 2010/0167699 A1 | 7/2010 | Sigmund et al. | |
| 2010/0195807 A1 | 8/2010 | Sigmund et al. | |
| 2010/0222024 A1 | 9/2010 | Sigmund et al. | |
| 2011/0085646 A1 | 4/2011 | Sigmund et al. | |
| 2013/0010937 A1 | 1/2013 | Sigmund et al. | |
| 2013/0012173 A1 | 1/2013 | Sigmund et al. | |
| 2013/0040614 A1 | 2/2013 | Sigmund et al. | |

FOREIGN PATENT DOCUMENTS

| | | |
|---|---|---|
| EP | 1113631 A2 * | 7/2001 |
| EP | 1 434 415 | 6/2004 |
| EP | 1 599 022 | 11/2005 |
| KR | 2005 0001246 | 1/2005 |
| WO | WO 97/45991 | 12/1997 |
| WO | WO 98/03005 | 1/1998 |
| WO | WO 00/73947 | 12/2000 |
| WO | WO 02/065745 | 8/2002 |
| WO | WO 2004/046895 | 6/2004 |
| WO | WO 2007/081929 | 7/2007 |
| WO | WO 2007/095510 | 8/2007 |
| WO | WO 2007/096866 | 8/2007 |
| WO | WO 2008/034555 | 3/2008 |
| WO | WO 2009/029296 | 3/2009 |
| WO | WO 2009/029297 | 3/2009 |
| WO | WO 2009/029298 | 3/2009 |
| WO | WO 2009/029313 | 3/2009 |
| WO | WO 2009/029314 | 3/2009 |
| WO | WO 2009/029323 | 3/2009 |
| WO | WO 2009/029324 | 3/2009 |
| WO | WO 2009/029328 | 3/2009 |
| WO | WO 2009/029330 | 3/2009 |
| WO | WO 2010/002382 | 1/2010 |

OTHER PUBLICATIONS

Office Action mailed on Jun. 4, 2013 in U.S. Appl. No. 13/785,710.
U.S. Office Action dated Jul. 30, 2012 in U.S. Appl. No. 12/161,027.
U.S. Office Action dated Sep. 14, 2012 in U.S. Appl. No. 12/161,064.
U.S. Office Action dated Oct. 4, 2012 in U.S. Appl. No. 12/485,484.
U.S. Office Action dated Oct. 2, 2012 in U.S. Appl. No. 12/485,961.
U.S. Office Action dated Oct. 11, 2012 in U.S. Appl. No. 12/160,946.
U.S. Notice of Allowance dated Nov. 21, 2012 in U.S. Appl. No. 12/477,971.
U.S. Notice of Allowance dated Nov. 23, 2012 in U.S. Appl. No. 12/485,335.
U.S. Notice of Allowance dated Oct. 25, 2012 in U.S. Appl. No. 12/160,940.

(56) References Cited

OTHER PUBLICATIONS

U.S. Notice of Allowance dated Nov. 16, 2012 in U.S. Appl. No. 12/161,027.
U.S. Notice of Allowance dated May 26, 2011 in U.S. Appl. No. 12/201,945.
U.S. Official Action dated Sep. 19, 2011 in U.S. Appl. No. 12/477,971.
U.S. Official Action dated Apr. 25, 2012 in U.S. Appl. No. 12/477,971.
U.S. Official Action dated Oct. 13, 2011 in U.S. Appl. No. 12/485,335.
U.S. Official Action dated May 22, 2012 in U.S. Appl. No. 12/485,335.
U.S. Official Action dated Dec. 22, 2010 in U.S. Appl. No. 12/160,940.
U.S. Official Action dated May 31, 2011 in U.S. Appl. No. 12/160,940.
U.S. Official Action dated Apr. 24, 2012 in U.S. Appl. No. 12/160,940.
U.S. Official Action dated Apr. 26, 2012 in U.S. Appl. No. 12/160,946.
U.S. Official Action dated Nov. 4, 2011 in U.S. Appl. No. 12/160,956.
U.S. Official Action dated Jun. 6, 2012 in U.S. Appl. No. 12/160,956.
U.S. Official Action dated Jan. 12, 2011 in U.S. Appl. No. 12/161,021.
U.S. Official Action dated Jun. 1, 2011 in U.S. Appl. No. 12/161,021.
U.S. Official Action dated Dec. 15, 2011 in U.S. Appl. No. 12/161,021.
U.S. Notice of Allowance dated Jun. 21, 2012 in U.S. Appl. No. 12/161,021.
U.S. Official Action dated Nov. 29, 2010 in U.S. Appl. No. 12/161,027.
U.S. Official Action dated May 10, 2011 in U.S. Appl. No. 12/161,027.
U.S. Official Action dated Nov. 23, 2011 in U.S. Appl. No. 12/161,027.
U.S. Official Action dated Dec. 27, 2010 in U.S. Appl. No. 12/161,033.
U.S. Official Action dated May 31, 2011 in U.S. Appl. No. 12/161,033.
U.S. Official Action dated Nov. 29, 2011 in U.S. Appl. No. 12/161,033.
U.S. Official Action dated Jun. 6, 2012 in U.S. Appl. No. 12/161,033.
U.S. Notice of Allowance dated Jul. 24, 2012 in U.S. Appl. No. 12/161,033.
U.S. Official Action dated Dec. 23, 2010 in U.S. Appl. No. 12/161,035.
U.S. Official Action dated Jun. 2, 2011 in U.S. Appl. No. 12/161,035.
U.S. Official Action dated Dec. 2, 2011 in U.S. Appl. No. 12/161,035.
U.S. Office Action dated Jul. 18, 2012 in U.S. Appl. No. 12/161,035.
U.S. Official Action dated Jan. 24, 2011 in U.S. Appl. No. 12/161,064.
U.S. Official Action dated Jul. 8, 2011 in U.S. Appl. No. 12/161,064.
U.S. Official Action dated Jan. 30, 2012 in U.S. Appl. No. 12/161,064.
U.S. Official Action dated Jan. 19, 2011 in U.S. Appl. No. 12/161,076.
U.S. Official Action dated Jul. 1, 2011 in U.S. Appl. No. 12/161,076.
U.S. Official Action dated Jan. 17, 2012 in U.S. Appl. No. 12/161,076.
U.S. Notice of Allowance dated Jul. 17, 2012 in U.S. Appl. No. 12/161,076.
International Search Report & Written Opinion dated Sep. 18, 2008 in PCT Application PCT/US08/67612.
International Search Report & Written Opinion dated Aug. 1, 2008 in PCT Application PCT/US08/61493.
International Search Report & Written Opinion dated Nov. 12, 2008 in PCT Application PCT/US08/65046.
International Search Report & Written Opinion dated Mar. 13, 2009 in PCT Application PCT/US08/68738.
International Search Report & Written Opinion dated Oct. 29, 2008 in PCT Application PCT/US08/67176.
International Search Report & Written Opinion dated Sep. 4, 2008 in PCT Application PCT/US08/54074.
International Search Report & Written Opinion dated Sep. 3, 2008 in PCT Application PCT/US08/61592.
International Search Report & Written Opinion dated Sep. 4, 2008 in PCT Application PCT/US08/67152.
International Search Report & Written Opinion dated Nov. 6, 2008 in PCT Application PCT/US08/67591.
International Search Report & Written Opinion dated Aug. 28, 2008 in PCT Application PCT/US08/61437.
U.S. Notice of Allowance dated Feb. 28, 2013 in U.S. Appl. No. 12/161,064.
U.S. Office Action dated Feb. 28, 2013 in U.S. Appl. No. 13/654,480.
U.S. Appl. No. 13/751,505, filed Jan. 28, 2013 to Sigmund et al.
U.S. Appl. No. 13/785,710, filed Mar. 5, 2013 to Sigmund et al.
U.S. Notice of Allowance dated Jan. 31, 2013 in U.S. Appl. No. 12/485,961.
U.S. Notice of Allowance dated Dec. 27, 2012 in U.S. Appl. No. 13/616,198.
Office Action mailed Jan. 21, 2014 in U.S. Appl. No. 13/654,480.
Office Action mailed Oct. 22, 2013 in U.S. Appl. No. 13/930,210.

\* cited by examiner

TOGGLING VOICEMAIL CLASS OF SERVICE

RELATED APPLICATION

This application claims priority to U.S. Provisional Patent Application No. 60/969,419, filed Aug. 31, 2007, the entirety of which is hereby incorporated by reference.

TECHNICAL FIELD

The present disclosure relates generally to voicemail and, more particularly, to providing a toggle feature for toggling voicemail class of service (CoS) between plain old voicemail (POVM) and visual voicemail (VVM).

BACKGROUND

Voicemail systems allow a caller to leave a voice message if the desired recipient is unavailable. Traditional voicemail systems (referred to herein as plain old voicemail or POVM) allow a subscriber to place a call to a voicemail system to access messages stored in his or her voicemail box. This is done through a telephone user interface (TUI) that facilitates interaction between the subscriber and the voicemail system. The TUI provides functions for the subscriber to listen to messages, skip messages, delete messages, and save messages. The TUI also provides functions for the subscriber to set a voicemail greeting, record a voicemail greeting, record a name, and set/change a password.

A subscriber with multiple voicemail messages is required to listen to, skip, delete, or save each message while reviewing the voicemail box. This is time consuming and can be frustrating for the subscriber in situations where an important message has been deposited, requiring the subscriber to listen to, skip, delete or save each message in search of the important message.

To help reduce the need to search through multiple messages, various improved voicemail systems have been developed that allow messages to be stored based on a priority scheme to increase the efficiency of listening to voicemail messages. Often, these systems use a telephone number of the caller to identify a priority for a message and position the voicemail messages in order based on the assigned priorities. When the recipient accesses the voicemail system to acquire voicemail messages, the recipient is presented with each voicemail message in order of the priority or importance to the recipient. This reduces unwanted listening or skipping through multiple voicemail messages to find an important message. However, an important message can easily be relegated to a position of low importance if the subscriber has not previously set the priority for the caller. In this system, the priority for an incoming voicemail message is determined directly by the telephone number associated with the caller.

The aforementioned systems fail to allow a subscriber to select the exact voicemail message the subscriber would like to hear. Further, the aforementioned systems require the use of a TUI to access the voicemail system. Still further, these systems merely notify a subscriber of a pending voicemail message with a message waiting indicator (MWI) and require that the subscriber access the voicemail system to retrieve the pending message(s).

Thus, it is desirable to create new enhanced voicemail systems and novel methods for providing visual voicemail (VVM) services. Moreover, there is a need to toggle between VVM service and POVM service from a subscriber's mobile device.

SUMMARY

A method for toggling voicemail class of service (CoS) can include receiving a subscriber-initiated CoS change request at a billing system, wherein the CoS change request includes a request to change from a first CoS associated with a first voicemail system (VMS) to a second CoS associated with a second VMS. The subscriber-initiated CoS change request can be received from a mobile device. The method can further include validating the CoS change request at the billing system, sending a CoS delete request to the first VMS to at least temporarily disable a first voicemail account, and sending a provisioning request to the second VMS to provision a second voicemail account. The validating step can include determining if a subscriber associated with the first voicemail account is authenticated for the voicemail service provided by the second VMS.

The aforementioned method can further include sending a first boot message to the mobile device if the second VMS is a visual voicemail system (VVMS) and the second voicemail account is a VVM account.

In one embodiment, the first VMS is a plain old voicemail system (POVMS) and the second VMS is a VVMS. In another embodiment, the first VMS is a VVMS and the second VMS is a POVMS.

A computer-readable medium on a mobile device includes computer-executable instructions that, when executed, perform the steps of receiving an input to toggle between a first voicemail service and a second voicemail service, generating and sending a voicemail CoS change request message based upon the input, and receiving a notification that a voicemail account is provisioned on the second VMS. The CoS change request can include a request to change from a first CoS associated with a first VMS to a second CoS associated with a second VMS.

The aforementioned computer-readable medium can further include instructions that, when executed, perform the step of receiving a first boot message if the second VMS is a VVMS and the second voicemail account is a VVM account.

In one embodiment, the first voicemail service is a POVM service and the first VMS is a POVMS, and the second voicemail service is a VVM service and the second VMS is a VVMS. In another embodiment, the first voicemail service is a VVM service and the first VMS is a VVMS, and the second voicemail service is a POVM service and the second VMS is a POVMS.

A system for providing a voicemail CoS toggle feature includes a mobile device configured to generate and send a subscriber-initiated CoS change request to a billing system, wherein the CoS change request includes a request to change from a first CoS associated with a first VMS to a second CoS associated with a second VMS. The billing system can be configured to receive the subscriber-initiated CoS change request, validate the CoS change request, generate and send a CoS delete request to the first VMS to at least temporarily disable a first voicemail account, and generate and send a provisioning request to the second VMS to provision a second voicemail account.

The aforementioned billing system can be further configured to generate and send a first boot message if the second VMS is a VVMS and the second voicemail account is a VVM account.

In one embodiment, the first VMS is a POVMS and the second VMS is a VVMS. In another embodiment, the first VMS is a VVMS and the second VMS is a POVMS.

DETAILED DESCRIPTION

As required, detailed embodiments of the present disclosure are disclosed herein. It must be understood that the disclosed embodiments are merely exemplary examples of the disclosure that may be embodied in various and alternative forms, and combinations thereof. As used herein, the word "exemplary" is used expansively to refer to embodiments that serve as an illustration, specimen, model or pattern. The figures are not necessarily to scale and some features may be exaggerated or minimized to show details of particular components. In other instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

Figure 1:
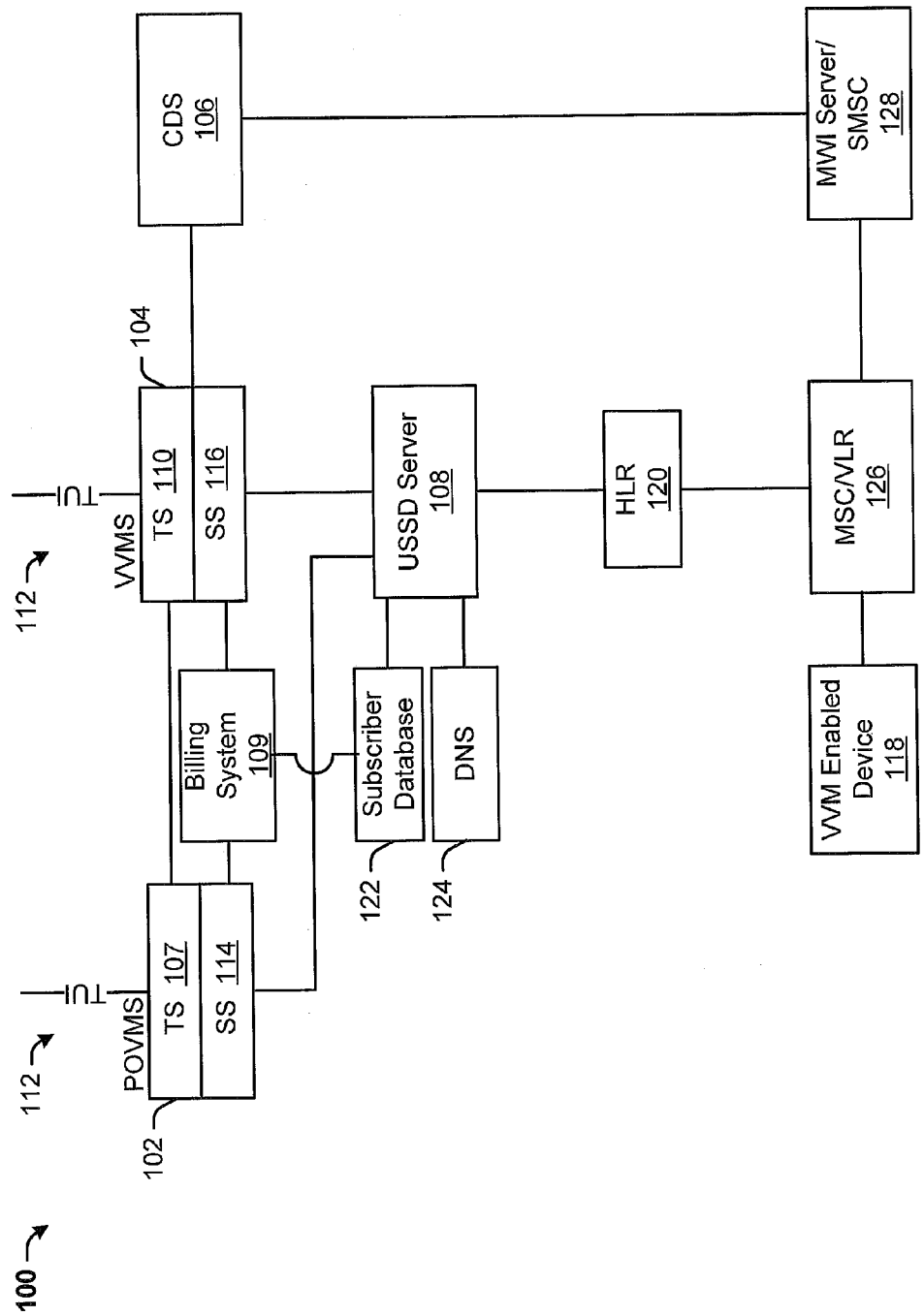
FIG. 1 schematically illustrates a communications network in which embodiments of the present disclosure can be implemented.

Referring now to the drawings wherein like numerals represent like elements throughout the several views, FIG. 1 schematically illustrates a wireless communications network 100 in which the various embodiments of the present disclosure can be implemented. By way of example, the wireless communications network 100 can be configured as a 2G GSM (Global System for Mobile communications) network and provide data communications via GPRS (General Packet Radio Service), and EDGE (Enhanced Data rates for GSM Evolution). By way of further example, the wireless communications network 100 can be configured as a 3G UMTS (Universal Mobile Telecommunications System) network and provide data communications via the HSPA (High-Speed Packet Access) protocol family, such as, HSDPA (High-Speed Downlink Packet Access), EUL (Enhanced Uplink) or otherwise termed HSUPA (High-Speed Uplink Packet Access), and HSPA+ (Evolved HSPA). The wireless communications network 100 is also compatible with future mobile communications standards including, but not limited to, pre-4G and 4G, for example. The wireless communications network 100 can be configured to provide messaging services via Short Message Service (SMS), Multimedia Message Service (MMS), and instant messaging, for example. The wireless communications network 100 can also be configured to provide advanced voicemail messaging features, such as visual voicemail.

The illustrated communications network 100 includes a plain old voicemail system (POVMS) 102 and a visual voicemail system (VVMS) 104. The POVMS 102 and VVMS 104 are illustrated as separate systems for clarity, but can be a single system with capabilities to handle both POVM and VVM services. Accordingly, at times, the POVMS 102 and VVMS 104 are collectively referred to as the voicemail system (VMS) 102, 104. It is contemplated that a subscriber can have at least one voicemail account in one or both of the POVMS 102 and the VVMS 104. It is further contemplated that the POVMS 102 and the VVMS 104 can be synchronized automatically at any time or manually based upon a request from the either or both of the subscriber and the service provider that operates the VMS 102, 104.

The VVMS 104 is illustrated as being in communication with a content delivery server (CDS) 106, an unstructured supplementary service data (USSD) server 108, and a billing system 109. The POVMS 102 is also illustrated as being in communication with the USSD server 108 and the billing system 109.

The POVMS 102 and the VVMS 104 can each include a telephony server (TS) 107, 110 for handling incoming voicemail inquiries via a telephone user interface (TUI) 112 and a storage server (SS) 114, 116 for storing and managing voicemail messages for a plurality of voicemail accounts, respectively.

The USSD server 108 can be configured to: receive, decode, and process new USSD messages; perform database queries to retrieve the VMS hostname serving a subscriber; perform database queries to resolve the VMS hostname to the corresponding IP address; obtain the subscriber's voicemail CoS; and send the subscriber's voicemail CoS to a VVM enabled device 118 (also referred to herein as the subscriber's mobile device (MD) 118). Accordingly, the USSD server 108 is in communication with a home location register (HLR) 120, a subscriber database 122, and a domain name server (DNS) 124 to facilitate these functions. The MD 118 can be, but is not limited to, a user equipment, a mobile terminal, a cellular telephone, a personal digital assistant (PDA), a handheld computer, or combinations thereof, and the like.

The billing system 109 can be configured to delete a first CoS on a first voicemail system and provision a second CoS on a second voicemail system. In one embodiment, the billing system 109 can be configured to delete a POVM CoS and provision a VVM CoS on the respective systems. This embodiment is described in detail below with reference to FIG. 2. In another embodiment, the billing system 109 can be configured to delete a VVM CoS and provision a POVM CoS on the respective systems. This embodiment is described in detail below with reference to FIG. 4.

The subscriber database 122 can be configured to store and manage subscriber data, such as, but not limited to, account information, services information, and equipment information for a plurality of subscribers. The subscriber database 122 can be in communication with the billing system 109 for retrieving billing information for a subscriber. It is contemplated that the subscriber database 122 and billing system 109 can be combined.

The DNS server 124 can be configured to maintain a database for resolving host names and IP addresses for various network nodes, such as the POVMS 102 and VVMS 104, for example. The USSD server 108 can retrieve a VMS hostname serving a subscriber from the subscriber database 122 and query the DNS 124 by specifying the VMS hostname to resolve the corresponding IP address.

The HLR 120 can be configured to provide routing information for mobile-terminated calls and short message service (SMS) messages. The HLR 120 is in communication with a mobile switching center (MSC) and visiting location register (VLR) 126. The MSC/VLR 126 is in communication with the MD 118 and a short message service center (SMSC) 128. The SMSC 128 can be configured to deliver SMS messages and message waiting indicator (MWI) messages.

The POVMS 102 and VVMS 104 can be configured to store a plurality of voicemail accounts. Each voicemail account can include a voicemail box in which voicemail messages can be deposited for a subscriber. The number of voicemail messages capable of being stored per account can be determined by the voicemail service provider or a third party, such as the system manufacturer, for example. The maximum voicemail message length can also be set. The number of voicemail messages and the maximum voicemail message length can be configurable on the POVM 102 and VVMS 104.

Prior to a subscriber being provisioned for visual voicemail service on the VVMS 104, the subscriber's voicemail box is in a not provisioned state. After being provisioned for visual voicemail service, the subscriber's voicemail box state is changed to provisioned—not initialized state to reflect that the subscriber is provisioned for service, but has not yet initialized service via a first boot access process described later with reference to FIG. 3. Upon completion of the first boot access process, the VVMS 104 state can be changed to provisioned—initialized to reflect that the subscriber is provisioned for voicemail service and has completed the first boot access process. It is contemplated that in certain embodiments a subscriber's VVM account remains active, but temporarily disabled or temporarily decommissioned.

State changes to voicemail messages, whether requested through TUI via POVM methods or directly on the MD 118 via VVM methods, are automatically updated in both the voicemail box and on the subscriber's MD 118. This ensures automatic and full synchronization between the subscriber's MD 118 and the VVMS 104 so that the latest voicemail information is stored on the subscriber's MD 118. The subscriber's VMS-hosted voicemail box can recognize and maintain message states for each message such as, but not limited to, an unheard—new state, a skipped state, and a saved—read state. Deleted messages can be deleted from the VVMS 104, via the TUI or directly on the MD 118. The message is deleted on both the VVMS 104 and the MD 118. However, in an alternative embodiment, deleted messages remain accessible on the MD 118 and/or on the VVMS 104 for a specified period of time to allow the message to be recovered in the case of accidental or premature deletion. In other embodiments, the VVMS 104 discards all messages after the MD 118 has successfully received and stored the available message content.

The MD 118 voicemail box also recognizes and maintains message states. The MD 118 voicemail box can have message states for each message including, but not limited to, an unheard—new state, a saved—read state, and a deleted state. The MD 118 does not require a skipped state because VVM provides an interface that allows a subscriber to access any message regardless of the order in which the message was received and is not subject to restraint of a priority scheme. As mentioned above, the MD 118 voicemail box deleted state can be configured such that the message is available for recovery or merely as an indication that the message has been deleted. Either of these options can be set to be available for a time specified by either the subscriber via a device input or by the voicemail service provider.

Figure 2:
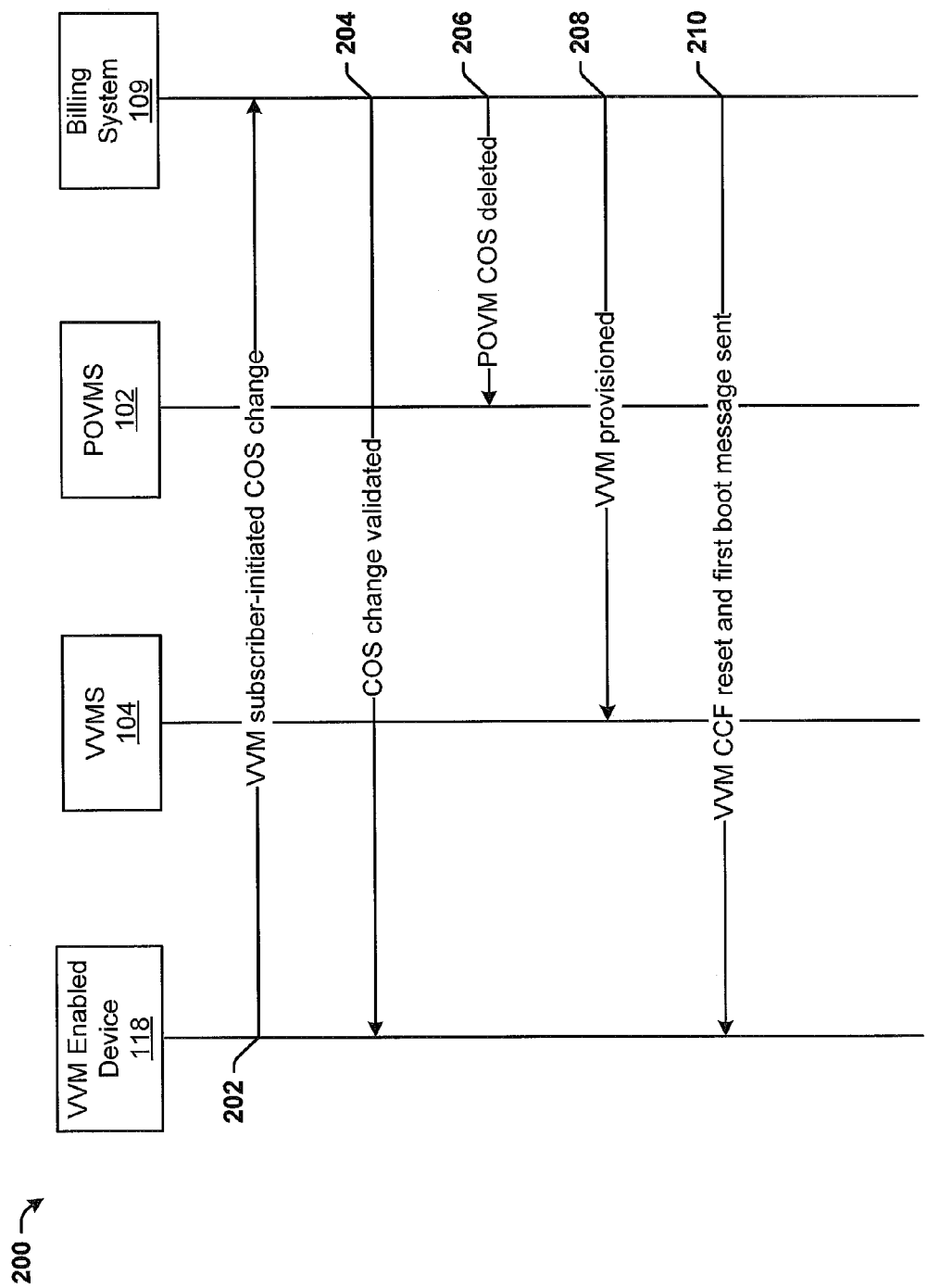
FIG. 2 illustrates an exemplary message flow diagram of a process for toggling voicemail CoS, according to one embodiment of the present disclosure.

Referring now to FIG. 2, an exemplary message flow diagram of a process 200 for toggling voicemail CoS is illustrated, according to one embodiment of the present disclosure. In the illustrated embodiment, a subscriber desires to change their voicemail CoS from a POVM service to a VVM service. The subscriber may have been previously provisioned for VVM service or may be accessing the VVM service for the first time. The general assumption with regard to this embodiment is that the MD 118 is a VVM enabled device. That is, the MD 118 includes VVM application specific software.

The process 200 begins at the MD 118 whereby a user can select an option to enable VVM. In step 202, after enabling the VVM option, the MD 118 can generate CoS change request and send the request to the billing system 109 for authentication. The request can be a lightweight directory access protocol (LDAP) request sent via an access point name, such as a Wireless Application Protocol (WAP) APN or WEB APN, for example. Alternatively, it is contemplated that the request can be delivered via an SMS message, a USSD message, or any other message type. It should be understood that all messages sent to and from the various nodes in the process 200 can be performed using LDAP, SMPP, USSD and like protocols.

After receipt of the CoS change request, the billing system 109 can determine if the subscriber is authenticated to use VVM. In step 204, the billing system 109 can generate an appropriate positive or negative acknowledgement response message (POSACK or NACK) based upon the authentication status. The billing system 109 can then send the response message to the MD 118. If the subscriber is authenticated for VVM service, the billing system 109 can generate a POVM CoS delete message and send the delete message to the POVMS 102 in step 206. The POVMS 102 can be identified by a voicemail system identification (VMS_ID). The POVMS 102 can receive the delete message and delete the subscriber's voicemail box or temporarily disable the voicemail box until a later request is received to reinstate the voicemail box. If the subscriber is not authenticated for VVM service, the billing system 109 can generate a NACK response message and send the NACK response message to the MD 118. The MD 118 can receive the NACK response message and can prompt the subscriber to call customer service.

In step 208, the billing system 109 can assign a VVMS 104 to the subscriber. The billing system 109 can use load balancing, for example, to determine in which VVMS the subscriber's voicemail box should be created. Alternatively, the billing system 109 can select the VVMS 104 in which the subscriber had a previous voicemail box, for example, a previously disabled voicemail box. The VVMS 104 can create a voicemail box for the subscriber or can enable a previously disabled voicemail box. In step 210, the conditional call forwarding (CCF) feature on the subscriber's account can be reset for the new VVMS 104 and a first boot message can be sent to the MD 118. An exemplary first boot message is described below with reference to FIG. 3.

Figure 3:
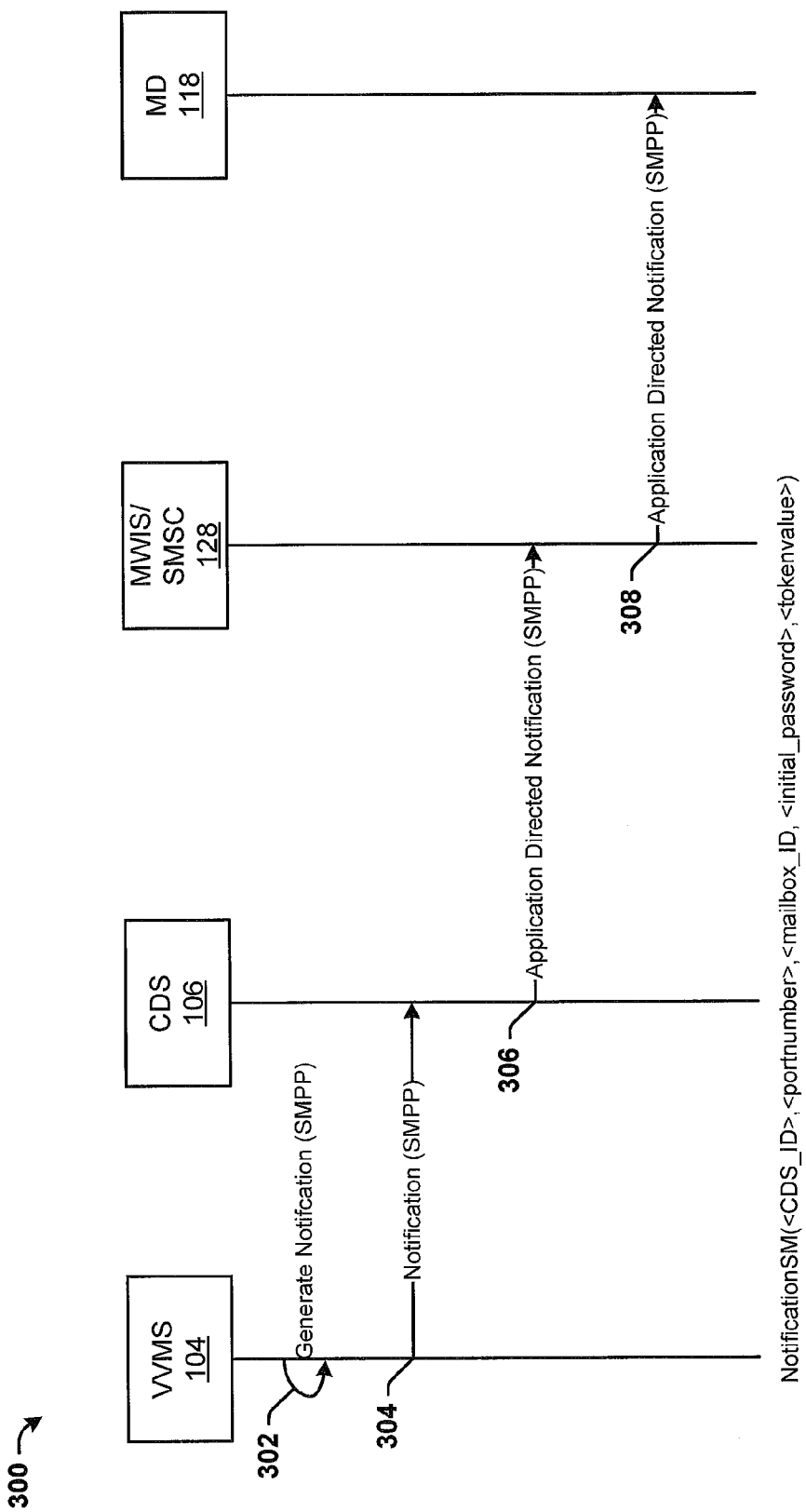
FIG. 3 illustrates an exemplary message flow diagram of a process for first boot access of a subscriber's mobile device to a visual voicemail system, according to one embodiment of the present disclosure.

Referring now to FIG. 3, a message flow diagram of an exemplary process 300 for first boot access of a subscriber's MD 118 to a VVMS 104 is illustrated, according to the present disclosure. The first boot access process 300 assumes that, the subscriber has been provisioned for VVM service and has the proper voicemail CoS as provided in the process 200 described above in FIG. 2. When the subscriber is initially provisioned to the VVMS 104 with a VVM CoS, the subscriber's account can be enabled for voicemail notification via the CDS 106. The VVMS 104 can initiate a notification message to the CDS 106 that is intended for delivery to the subscriber's MD 118 via a short message peer-to-peer (SMPP) message. This enables the subscriber to have confirmation that the VVM service is enabled and to immediately access the service via a VVM application. A visual prompt can be presented to the subscriber as a cue or reminder to setup a voicemail box prior to receipt of incoming voice messages. Conventional voicemail, in contrast, blocks receipt of new messages until the mailbox is set up, or notifies the subscriber of the first new voice messages thereby prompting the subscriber to place a call to retrieve them, but bars access to those messages until the subscriber sets up the mailbox. The visual prompt of the present disclosure advantageously eliminates the annoyance and need to access the voicemail system via the TUI 112 to setup the voicemail box and ensures the subscriber sets up a voicemail box.

The VVM service uses several parameters to enable automatic synchronization between the MD 118 and the VVMS 104. For example, prior to first boot, the MD 118 does not have this information. Accordingly, the first boot process 300 described below provides an initial SMPP message including a basic set of parameters for future synchronization sessions.

The process 300 begins when the VVMS 104 generates an SMPP notification message (notification_SM) in step 302. For example, a notification_SM message can include, but is not limited to, the hostname and port number for the subscriber's CDS 106, a token identifying the subscriber's VVMS 104, the subscriber's voicemail box ID (mailbox_ID) embedded with the token to uniquely identify the subscriber for the VVMS 104, and the current VVMS password (if the password has not already been set). In an alternative embodiment, the notification_SM can include the IP address and port number for the subscriber's CDS 106 and the mailbox_ID. The password and token can be added to increase security and preserve data integrity. If a password is used, the password may be unencrypted and instead the password can be obscured to hide the actual default password digits.

After the notification_SM message is generated, the VVMS 104 can send the message to the CDS 106 in step 304. In step 306, the CDS 106 can receive the notification_SM message and generate a VVM application directed notification_SM message and send the message to the SMSC 128. The SMSC 128 can receive the message and forward the message to the MD 118, in step 308. The application directed short message can be received by the MD 118 and sent directly to the VVM application. Typically, the user will not be notified of the incoming short message. The VVM application can generate any prompts necessary to guide the user through setup and other processes identified in the application directed short message upon receipt of the short message or at a time thereafter.

For situations in which VVM is temporarily unavailable for network maintenance, device maintenance, or other unforeseen circumstances, the VVM subscriber can access voicemail via the TUI 112 as a default access method.

Figure 4:
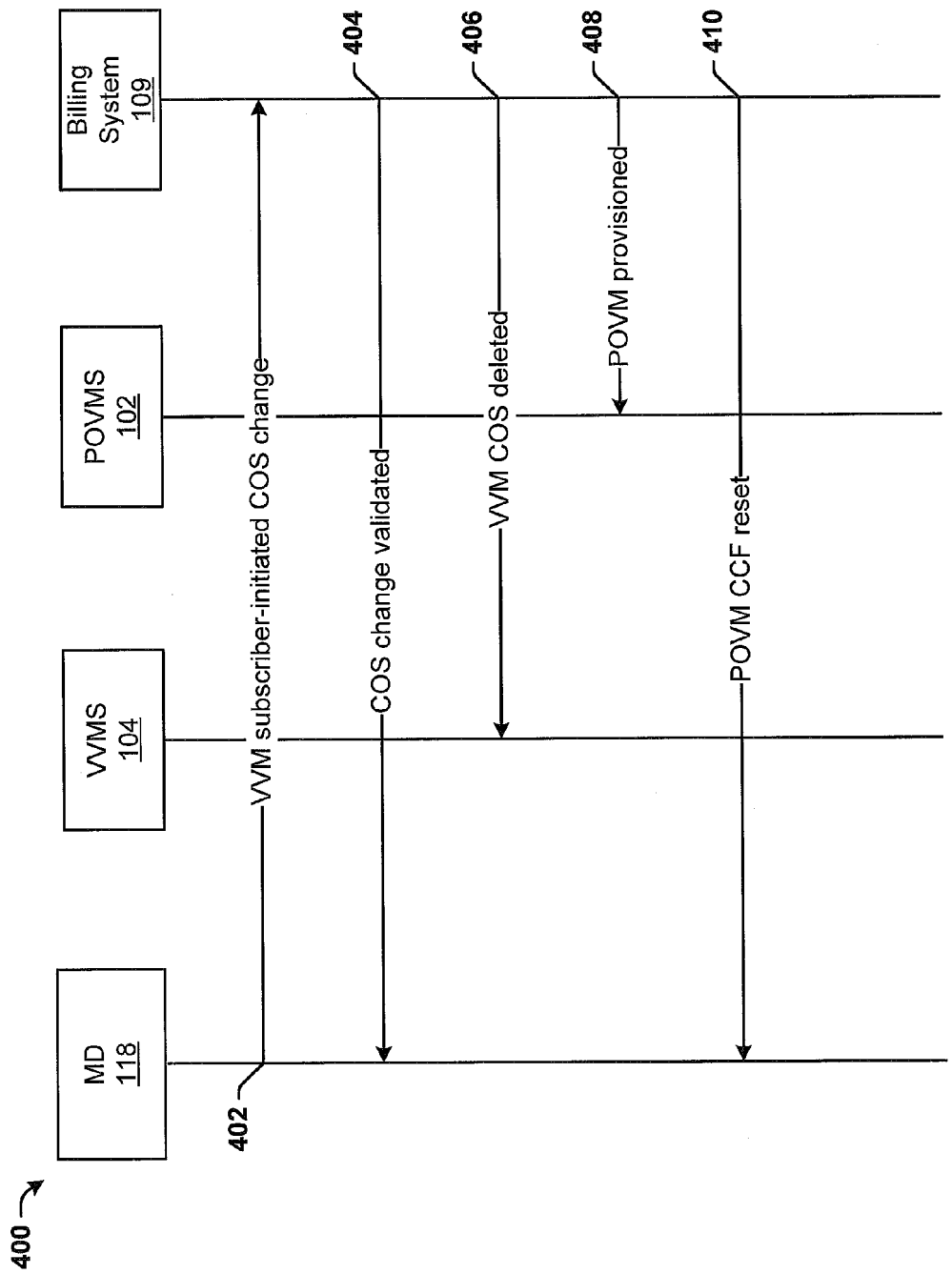
FIG. 4 illustrates an exemplary message flow diagram of a process for toggling voicemail CoS, according to another embodiment of the present disclosure.

Referring now to FIG. 4, a message flow diagram of an exemplary process 400 for toggling voicemail CoS is illustrated, according to another embodiment of the present disclosure. In the illustrated embodiment, a subscriber desires to change their voicemail CoS from a VVM service to a POVM service. The subscriber may have been previously provisioned for POVM service or may be accessing the POVM service for the first time. It should be understood that a subscriber that is provisioned for VVM service can also by default be provisioned for VVM service. That is, a VVM subscriber can use the TUI 112 to access voicemail messages stored at VMS 102, 104.

The process 400 begins at the MD 118 whereby a user can select an option to disable VVM. In step 402, after disabling the VVM option, the MD 118 can generate CoS change request and send the request to the billing system 109 for authentication. The request can be a LDAP request sent via an access point name, such as a WAP APN or WEB APN, for example. Alternatively, it is contemplated that the request can be delivered via an SMS message, a USSD message, or any other message type. It should be understood that all messages sent to and from the various nodes in the process 400 can be performed using LDAP, SMPP, USSD and like protocols.

After receipt of the CoS change request, the billing system 109 can determine if the subscriber is authenticated to change VM CoS. In step 404, the billing system 109 can generate an appropriate positive or negative acknowledgement response message (POSACK or NACK) based upon the authentication status. The billing system 109 then sends the response message to the MD 118.

In step 406, the billing system 109 can generate a VVM CoS delete message and send the delete message to the VVMS 104. The VVMS 104 can be identified by a voicemail system identifier (VMSID). The VVMS 104 can receive the delete message and delete the subscriber's voicemail box or temporarily disable the voicemail box until a later request is received to reinstate the voicemail box. If the subscriber is not authenticated to change voicemail CoS, the billing system 109 can generate a NACK response message and send the NACK response message to the MD 118. The MD 118 can receive the NACK response message and can prompt the subscriber to call customer service.

In step 408, the billing system 109 can assign a POVMS 102 to the subscriber. The billing system 109 can use load balancing, for example, to determine in which POVMS the subscriber's voicemail box should be created. Alternatively, the billing system 109 can select the POVMS in which the subscriber had a previous voicemail box, for example, a previously disabled voicemail box. The POVMS 102 can create a voicemail box for the subscriber or can enable a previously disabled voicemail box. In step 410, the CCF feature on the subscriber's account can be reset for the new POVMS.

Figure 5:
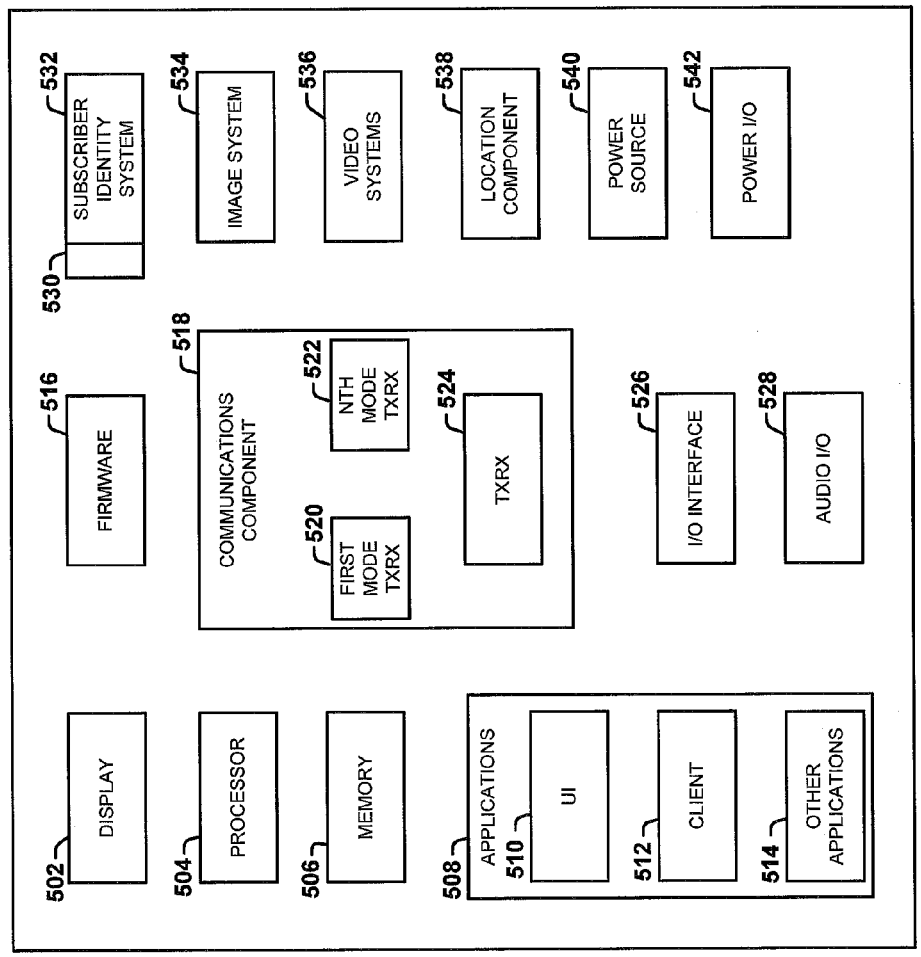
FIG. 5 schematically illustrates an exemplary mobile device and components thereof, according to an embodiment of the present disclosure.

FIG. 5 is a schematic block diagram illustrating an exemplary mobile device 118 for use in accordance with an exemplary embodiment of the present disclosure. Although no connections are shown between the components illustrated and described in FIG. 5, the components can interact with each other to carry out device functions.

As illustrated, the mobile device 118 can be a multimode handset. FIG. 5 and the following discussion are intended to provide a brief, general description of a suitable environment in which the various aspects of an embodiment of the present disclosure can be implemented. While the description includes a general context of computer-executable instructions, the present disclosure can also be implemented in combination with other program modules and/or as a combination of hardware and software.

Generally, applications can include routines, program modules, programs, components, data structures, and the like. Applications can be implemented on various system configurations, including single-processor or multiprocessor systems, minicomputers, mainframe computers, personal computers, hand-held computing devices, microprocessor-based, programmable consumer electronics, combinations thereof, and the like.

The device 118 includes a display 502 for displaying multimedia such as, for example, text, images, video, telephony functions, such as, visual voicemail data, caller line ID data, setup functions, menus, music metadata, messages, wallpaper, graphics, and the like. The display 502 finds particular application in the present disclosure for displaying visual voicemail data in visual voicemail headers. The visual voicemail headers can include the date, time, CLI data, message length, and message status (i.e., new-unread, read, saved, or deleted).

The device 118 can include a processor 504 for controlling, and/or processing data. A memory 506 can interface with the processor 504 for the storage of data and/or applications 508. The memory 506 can include a variety of computer readable media, including volatile media, non-volatile media, removable media, and non-removable media. Computer-readable media can include device storage media and communication media. Storage media can include volatile and/or non-volatile, removable and/or non-removable media such as, for example, RAM, ROM, EEPROM, flash memory or other memory technology, CD ROM, DVD, or other optical disk storage, magnetic tape, magnetic disk storage or other magnetic storage devices, or any other medium that can be used to store the desired information and that can be accessed by the device 118.

The memory 506 can be configured to store one or more applications 508, such as, for example, video player software, user feedback component software, combinations thereof, and the like. The applications 508 can also include a user interface (UI) application 510. The UI application 510 can interface with a client 512 (e.g., an operating system) to facilitate user interaction with device functionality and data, for example, answering/initiating calls, entering/deleting data, configuring settings, address book manipulation, multimode interaction, and the like. The applications 508 can include other applications 514 such as, for example, visual voicemail software, add-ons, plug-ins, voice recognition software, call voice processing, voice recording, messaging, e-mail processing, video processing, image processing, music play, combinations thereof, and the like, as well as subsystems and/or components. The applications 508 can be stored in the memory 506 and/or in a firmware 516, and can be executed by the processor 504. The firmware 516 can also store code for execution during initialization of the device 118.

A communications component 518 can interface with the processor 504 to facilitate wired/wireless communications with external systems including, for example, cellular networks, VoIP networks, LAN, WAN, MAN, PAN, that can be implemented using WiFi, WiMax, combinations and/or improvements thereof, and the like. The communications component 518 can also include a multimode communications subsystem for providing cellular communications via different cellular technologies. For example, a first cellular transceiver 520 can operate in one mode, for example, GSM, and an Nth transceiver 522 can operate in a different mode, for example WiFi. While only two transceivers 520, 522 are illustrated, it should be appreciated that a plurality of transceivers can be included. The communications component 518 can also include a transceiver 524 for unlicensed RF communications using technology such as, for example, WiFi, WiMAX, NFC, other RF and the like. The transceiver 524 can also be configured for line-of-sight technologies, such as, for example, infrared and IRDA. Although a single transceiver 524 is illustrated multiple transceivers for unlicensed RF and line-of-sight technologies are contemplated.

The communications component 518 can also facilitate communications reception from terrestrial radio networks, digital satellite radio networks, Internet-based radio services networks, combinations thereof, and the like. The communications component 518 can process data from a network, such as, for example, the Internet, a corporate intranet, a home broadband network, and the like, via an ISP, DSL provider, or other broadband service provider.

An input/output (I/O) interface 526 can be provided for input/output of data and/or signals. The I/O interface 526 can be a hardwire connection, such as, for example, a USB, PS2, IEEE 1394, serial, parallel, IEEE 802.3 (e.g., Ethernet—RJ45, RJ48), traditional telephone jack (e.g., RJ11, RJ14, RJ25) and the like, and can accept other I/O devices, such as, for example, a keyboard, keypad, mouse, interface tether, stylus pen, printer, plotter, jump/thumb drive, touch screen, touch pad, trackball, joy stick, controller, monitor, display, LCD, combinations thereof, and the like.

Audio capabilities can be provided by an audio I/O component 528 that can include a speaker (not shown) for the output of audio signals and a microphone (not shown) to collect audio signals.

The device 118 can include a slot interface 530 for accommodating a subscriber identity system 532, such as, for example, a SIM or universal SIM (USIM). The subscriber identity system 532 instead can be manufactured into the device 118, thereby obviating the need for a slot interface 530.

The device 118 can include an image capture and processing system 534. Photos and/or videos can be obtained via an associated image capture subsystem of the image system 534, for example, a camera. The device 118 can also include a video systems component 536 for processing, recording, and/or transmitting video content.

A location component 538 can be included to send and/or receive signals, such as, for example, GPS data, assisted GPS data, triangulation data, combinations thereof, and the like. The device 118 can use the received data to identify its location or can transmit data used by other devices to determine the device 118 location.

The device 118 can include a power source 540 such as batteries and/or other power subsystem (AC or DC). The power source 540 can be single-use, continuous, or rechargeable. In the case of the latter, the power source 540 can interface with an external power system or charging equipment via a power I/O component 542.

Figure 6:
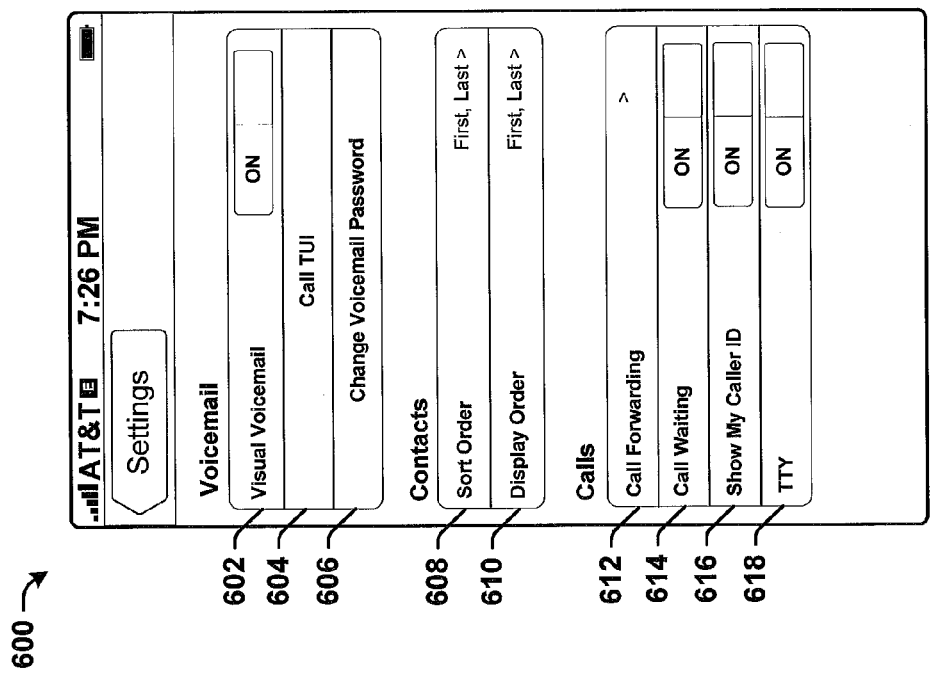
FIG. 6 illustrates an exemplary graphical user interface (GUI) screen for accessing phone functions including an option for toggling visual voicemail service, according to the present disclosure.

Referring also now to FIG. 6, an exemplary graphical user interface (GUI) screen 600 for accessing phone functions including toggling visual voicemail service is illustrated, according to the present disclosure. The illustrated GUI screen 600 includes a visual voicemail toggle option 602, a call TUI option 604, and a change voicemail password option 606. The visual voicemail toggle option 602 allows a user to turn VVM on and off. For example, a user may desire to turn VVM off when roaming internationally due to the high costs associated with international data roaming. Enabling the voicemail toggle option 602 can trigger the MD 118 to generate and send a CoS change request message 202, 402 to the billing system 109. The call TUI option 604 is a short cut way a user can call the TUI 112 to listen to voicemail messages or change voicemail settings of the POVM 102 or VVMS 104 via the TUI 112. The change voicemail password option 606 can allow the user to change the voicemail password associated with their VVM service on the MD 118.

The illustrated GUI screen 600 also includes a sort order option 608 whereby the user can select the order by which contacts are sorted, and a display order option 610 whereby the user can select the order by which contacts are displayed.

The illustrated GUI screen 600 can further include a call forwarding option 612 whereby the user can select a call forwarding number or numbers, a call waiting option 614 whereby the user can enable/disable a call waiting feature, a "show my caller ID" option 616 whereby the user can enable/disable a caller ID feature, and a TTY option 618 whereby the user can enable/disable a TTY feature.

The law does not require and it is economically prohibitive to illustrate and teach every possible embodiment of the present claims. Hence, the above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

What is claimed is:

1. A method for toggling voicemail class of service, the method comprising:
   receiving, at a billing system, a class of service change request from a subscriber, the class of service change request comprising a request to change from a plain old voicemail service associated with a plain old voicemail system, the plain old voicemail system comprising a plain old voicemail account associated with the subscriber for storing voicemail messages directed to the subscriber to a visual voicemail service;
   validating the class of service change request at the billing system; and
   in response to validating the class of service change request,
      sending, by the billing system, a class of service delete request to the plain old voicemail system to at least temporarily disable the plain old voicemail account associated with the subscriber,
      determining, by the billing system, a visual voicemail system for provisioning a visual voicemail account for providing the visual voicemail service to the subscriber, and
      sending, the billing system to the visual voicemail system, a provisioning request to provision the visual voicemail account for providing the visual voicemail service to the subscriber.

2. The method of claim 1, wherein determining the visual voicemail system for provisioning the visual voicemail account for providing the visual voicemail service to the subscriber comprises determining the visual voicemail system for provisioning the visual voicemail account for providing the visual voicemail service to the subscriber based on load balancing.

3. The method of claim 1, wherein the visual voicemail account comprises a previously-disabled voicemail box associated with the subscriber.

4. The method of claim 1, wherein the class of service change request is initiated in response to a selection of a visual voicemail toggle option provided via a graphical user interface displayed by a mobile device of the subscriber.

5. The method of claim 1, wherein receiving the class of service change request from the subscriber comprises receiving the class of service change request from a mobile device associated with the subscriber.

6. The method of claim 5, further comprising sending a first boot message to the mobile device.

7. The method of claim 1, wherein validating the class of service change request at the billing system comprises determining if the subscriber associated with the plain old voicemail account is authenticated for service provided by the visual voicemail system.

8. A method for toggling voicemail class of service, the method comprising:
   receiving, at a billing system, a class of service change request from a subscriber, the class of service change request comprising a request to change from a visual voicemail service associated with a visual voicemail system, visual voicemail system comprising a visual voicemail account associated with the subscriber for storing voicemail messages directed to the subscriber to a plain old voicemail service;
   validating, by the billing system, the class of service change request; and
   in response to validating the class of service change request,
      sending, by the billing system, a class of service delete request to the visual voicemail system to at least temporarily disable the visual voicemail account associated with the subscriber,
      determining, by the billing system, a plain old voicemail system for provisioning a plain old voicemail account for providing the plain old voicemail service to the subscriber, and
      sending, by the billing system to the plain old voicemail system, a provisioning request to provision the plain old voicemail account for providing the plain old voicemail service to the subscriber.

9. The method of claim 8, wherein determining the plain old voicemail system for provisioning the plain old voicemail account for provisioning the plain old voicemail service to the subscriber comprises determining the plain old voicemail system for provisioning the plain old voicemail account for provisioning the plain old voicemail service to the subscriber based on load balancing.

10. The method of claim 8, wherein the plain old voicemail account comprises a previously-disabled voicemail box associated with the subscriber.

11. The method of claim 8, wherein the class of service change request is initiated in response to a selection of a visual voicemail toggle option provided via a graphical user interface displayed by a mobile device of the subscriber.

* * * * *